United States Patent
Miller et al.

(10) Patent No.: US 10,107,378 B2
(45) Date of Patent: Oct. 23, 2018

(54) SYSTEMS AND METHODS FOR A GAS TURBINE ENGINE WITH COMBINED MULTI-DIRECTIONAL GEARBOX DEFLECTION LIMITERS AND DAMPERS

(71) Applicant: General Electric Company, Schenectady, NY (US)

(72) Inventors: Brandon Wayne Miller, Middletown, OH (US); Randy M. Vondrell, Sharonville, OH (US); Donald Albert Bradley, Cincinnati, OH (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 14/931,488

(22) Filed: Nov. 3, 2015

(65) Prior Publication Data
US 2017/0122426 A1    May 4, 2017

(51) Int. Cl.
*F16H 57/00* (2012.01)
*F02C 7/36* (2006.01)
(Continued)

(52) U.S. Cl.
CPC ......... *F16H 57/0006* (2013.01); *F02C 3/107* (2013.01); *F02C 7/36* (2013.01);
(Continued)

(58) Field of Classification Search
CPC .... F16H 57/0006; F16H 57/082; F02C 3/107; F02C 7/36; F05D 2260/40311; F05D 2260/96
See application file for complete search history.

(56) References Cited

U.S. PATENT DOCUMENTS

| 5,433,674 A | 7/1995 | Sheridan et al. |
| 5,603,574 A | 2/1997 | Ide et al. |

(Continued)

FOREIGN PATENT DOCUMENTS

WO    2015/052409 A1    4/2015

OTHER PUBLICATIONS

U.S. Appl. No. 14/857,164, filed Sep. 17, 2015, entitled Multi-Directional Gearbox Deflection Limiter for a Gas Turbine Engine.
(Continued)

*Primary Examiner* — Sherry L Estremsky
(74) *Attorney, Agent, or Firm* — General Electric Company; Pamela Kachur (57) ABSTRACT

A planet gear train for an engine casing includes a sun gear rotatable by a shaft, a ring gear, a plurality of planet gears rotatably mounted in a planet carrier and meshing with the sun gear and the ring gear, and a damping system. The damping system includes a soft mount disposed about the shaft and coupling the planet carrier the engine casing. The soft mount includes a flexible inner sleeve and a flexible outer sleeve. The flexible inner sleeve and the flexible outer sleeve are fixedly coupled together at respective central portions thereof near the shaft. The damping system further includes a plurality of damping couplers disposed about an outer flange of the planet carrier. The plurality of damping couplers is configured to flexibly couple the flexible inner sleeve to the flexible outer sleeve.

15 Claims, 6 Drawing Sheets

(51) Int. Cl.
  *F16H 1/28* (2006.01)
  *F16H 57/08* (2006.01)
  *F02K 3/06* (2006.01)
  *F02C 3/107* (2006.01)

(52) U.S. Cl.
  CPC ............... *F02K 3/06* (2013.01); *F16H 1/28* (2013.01); *F16H 57/082* (2013.01); *F05D 2260/40311* (2013.01); *F05D 2260/96* (2013.01)

(56) References Cited

U.S. PATENT DOCUMENTS

| | | | |
|---|---|---|---|
| 6,183,388 B1 | 2/2001 | Hawkins | |
| 6,212,974 B1 | 4/2001 | Van Duyn | |
| 6,223,616 B1 | 5/2001 | Sheridan | |
| 6,402,219 B1* | 6/2002 | Hopf | F16F 3/12 248/565 |
| 6,669,393 B2 | 12/2003 | Schilling | |
| 7,591,754 B2 | 9/2009 | Duong et al. | |
| 8,256,750 B2 | 9/2012 | Coffin et al. | |
| 8,272,786 B2 | 9/2012 | Cottrell | |
| 8,517,670 B1 | 8/2013 | Coffin et al. | |
| 8,529,197 B1* | 9/2013 | Coffin | F01D 25/04 415/119 |
| 8,561,501 B2 | 10/2013 | Niggemeier et al. | |
| 8,573,926 B2 | 11/2013 | Coffin et al. | |
| 8,585,538 B2 | 11/2013 | Sheridan et al. | |
| 8,585,539 B2 | 11/2013 | Sheridan et al. | |
| 8,672,801 B2 | 3/2014 | McCune et al. | |
| 8,790,075 B2 | 7/2014 | Coffin et al. | |
| 8,827,633 B2 | 9/2014 | Coffin et al. | |
| 9,033,653 B2 | 5/2015 | Coffin et al. | |
| 9,046,041 B2 | 6/2015 | Rejman et al. | |
| 2011/0140441 A1 | 6/2011 | Longtin | |
| 2014/0011623 A1 | 1/2014 | Sheridan et al. | |
| 2016/0186604 A1* | 6/2016 | Ertas | F02C 3/107 415/119 |
| 2017/0082031 A1* | 3/2017 | Miller | F01D 25/28 |
| 2017/0159608 A1* | 6/2017 | Ertas | F02K 3/06 |

OTHER PUBLICATIONS

U.S. Appl. No. 14/585,665, filed Dec. 30, 2014, entitled Flexibly Damped Mounting Assemblies for Power Gear Box Transmissions in Geared Aircraft Engine Architectures.

Extended European Search Report and Opinion issued in connection with corresponding EP Application No. 16196830.0 dated Apr. 3, 2017.

\* cited by examiner

SYSTEMS AND METHODS FOR A GAS TURBINE ENGINE WITH COMBINED MULTI-DIRECTIONAL GEARBOX DEFLECTION LIMITERS AND DAMPERS

BACKGROUND

The field of the disclosure relates generally to gas turbine engines and, more particularly, to a method and system and for damping resonance from, and limiting deflection of a gearbox in a gas turbine engine.

Gas turbine engines typically include integrated drive power gearboxes that transfer energy from one shaft to another shaft. Planetary integrated drive power gearboxes are typically used in aircraft engines because of their compact design. The shafts are typically mounted on soft bearing supports that allow compliance and flexibility to limit shaft bending during high external stresses external misalignment. Planetary gearboxes include a number of rotating gears, which can wear over time from misalignment caused by external stress. To mitigate misalignment, the gearbox is flexibly mounted to the engine casing by a soft mount structure to isolate the gearbox from externally applied misalignments. Deflection limiters are typically utilized to constrain the amount of movement of the gearbox that is allowed by the flexible mounting structure. The rotating gears of the planetary gearbox can also create vibration that can be transmitted to the engine casing, particularly when moving across rotation speeds that create resonances within the engine structure.

Dampers have been employed to attenuate the effect of vibration at resonance crossings, whereas a deflection limiter is a "hard stop," which prevents significant movement of the gearbox, or individual gears therein, past a particular point. Gearbox movement can be in the axial direction of the shaft, in the radial direction perpendicular to the shaft, and/or in the circumferential direction, that is, rotational movement of the gearbox about the shaft. Deflection limiters have sometimes been employed together with a damper, but such limiters have been restricted to be able to only prevent movement in one of the axial and radial direction.

BRIEF DESCRIPTION

In one embodiment, a planetary gear train for an engine casing includes a sun gear rotatable by a shaft, a ring gear, a plurality of planet gears rotatably mounted in a planet carrier and meshing with the sun gear and the ring gear, and a damping system. The damping system includes a soft mount disposed about the shaft and coupling the planet carrier the engine casing. The soft mount includes a flexible inner sleeve and a flexible outer sleeve. The flexible inner sleeve and the flexible outer sleeve are fixedly coupled together at respective central portions thereof near the shaft. The damping system further includes a plurality of damping couplers disposed about an outer flange of the planet carrier. The plurality of damping couplers is configured to flexibly couple the flexible inner sleeve to the flexible outer sleeve.

In another embodiment, a method of damping torsional vibration of a epicyclic gear train having a planet carrier includes steps of arranging a plurality of damping couplers evenly spaced about a generally circular periphery of the planet carrier, applying a torsional force to the planet carrier about a central axis of the generally circular periphery, and linearly damping an amount of the torsional force experienced by each of the plurality of damping couplers in a direction tangential to the torsional force.

In yet another embodiment, a damping apparatus includes a main body having an upper terminal end and a lower terminal end. The main body includes a cylindrical inner ring and a cylindrical outer ring. The damping apparatus further includes a plurality of curved splines connecting the cylindrical inner ring to the cylindrical outer ring. The plurality of curved splines extends along a cylindrical length through the main body from the upper terminal end to the lower terminal end. The damping apparatus further includes a plurality of slot portions disposed concentrically between an external circumference of the outer ring and an internal circumference of the inner ring. The plurality of slot portions also extends along the cylindrical length through the main body from the upper terminal end to the lower terminal end. The damping apparatus still further includes a central spring disposed within the cylindrical inner ring. The central spring includes an upper spring portion terminating within the cylindrical inner ring below the upper terminal end, and a lower spring base terminating outside of the inner cylindrical ring below the lower terminal end.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-7 show example embodiments of the method and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The following detailed description illustrates embodiments of the disclosure by way of example and not by way of limitation. It is contemplated that the disclosure has general application to damping resonant frequencies and limiting deflection of gas turbine engine components that are soft-mounted to the engine casing.

Embodiments of a multidirectional damping limiter for a soft mounted planetary gearbox are described herein. The multidirectional damping limiter described herein restricts movement of the planetary gearbox in the axial, radial, and circumferential directions, and also damps vibrations emanating from the gearbox that may transfer to the engine casing. In combination, a plurality of multidirectional damping limiters can serve to convert circumferential, or torsional, rotation of the gearbox into linear displacement of individual damping limiters.

In the planetary gearbox, alignment of the individual gears and components is important. The gears should be aligned so that one planetary gear is not taking significantly higher load than the other gears. Soft mounting the gearbox to the engine casing reduces the overloading of individual gears. However, soft mounting also allows the gearbox to move more with respect to the engine casing, thus increasing the amount dynamic and vibrational response activity of the power gearbox as a whole.

The method and system herein will limit movement of the soft mounted gearbox in three directions while damping vibrations emanating from the gearbox as a whole, instead of individual gears within the planetary gearbox. The planetary gearbox is not designed to allow flexibility movement of individual gears with respect to other gears.

The following description refers to the accompanying drawings, in which, in the absence of a contrary representation, the same numbers in different drawings represent similar elements.

Figure 1:
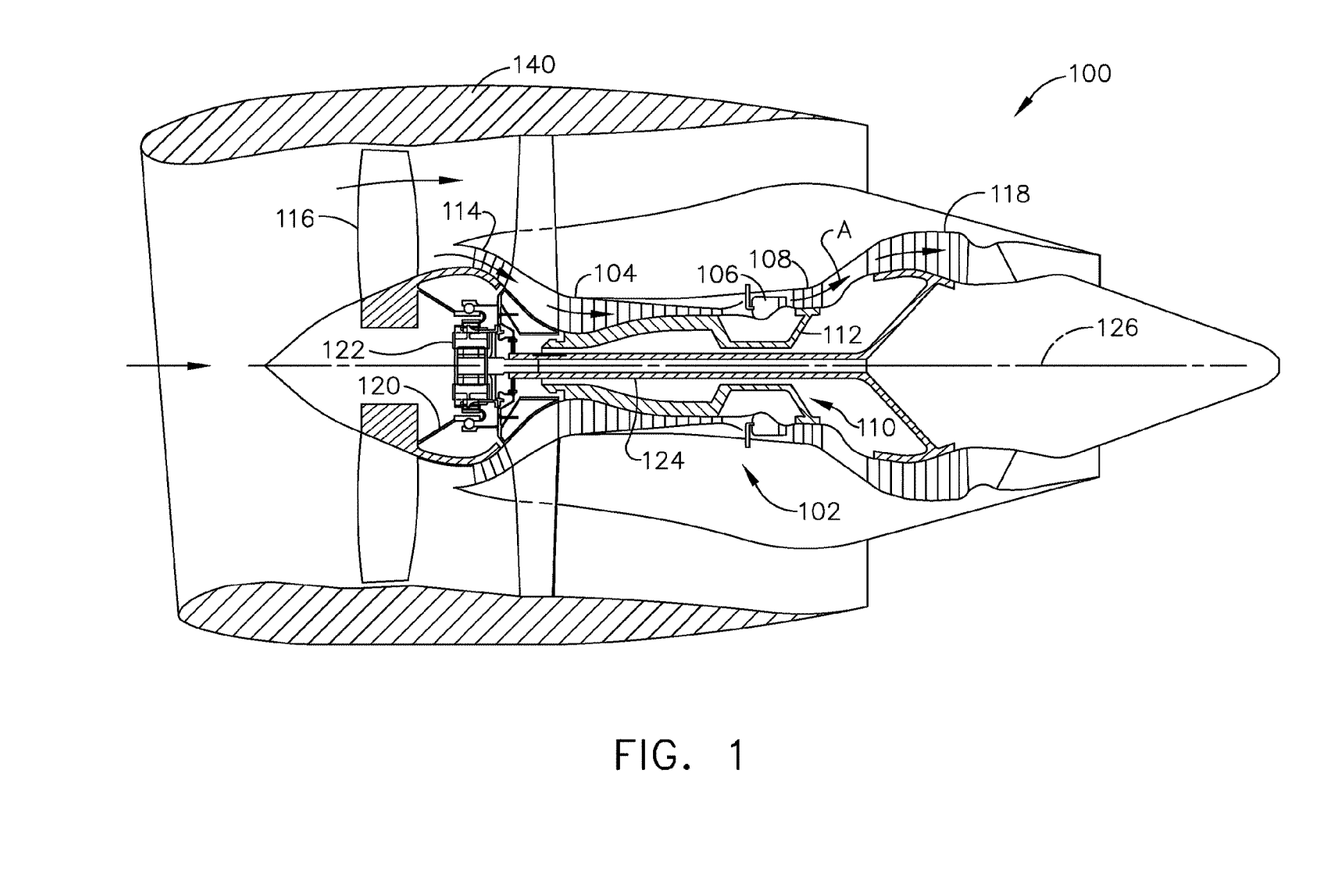
FIG. 1 is a schematic view of a gas turbine engine.

FIG. 1 is a schematic illustration of an exemplary gas turbine engine 100. Gas turbine engine 100 includes a gas generator or core engine 102 that includes a high pressure compressor (HPC) 104, a combustor assembly 106, and a high pressure turbine (HPT) 108 in an axial serial flow relationship on a core engine rotor 110 rotating about a core engine shaft 112. Gas turbine engine 100 also includes a low pressure compressor 114 and a fan 116, and a low pressure turbine 118 arranged in an axial flow relationship on a power engine rotor 120. An integrated drive power gearbox 122 is axially coupled to both power engine rotor 120 and a power engine shaft 124.

During operation, air flows along a central axis 126, and compressed air is supplied to high pressure compressor 104. Highly compressed air is then delivered to combustor assembly 106. Exhaust gas flow A from combustor assembly 106 drives turbines 108 and 118, and turbine 118 drives integrated drive power gearbox 122, which drives power engine rotor 120, in addition to low pressure compressor 114 and fan 116. Gas turbine engine 100 also includes a containment case 140 for low pressure compressor 114 and fan 116.

Furthermore, additional and/or different elements not shown may be contained in, or coupled to the elements shown in FIG. 1, and/or certain illustrated elements may be absent. In some examples, the functions provided by the illustrated elements could be performed by less than the illustrated number of components or even by a single element.

Figure 2:
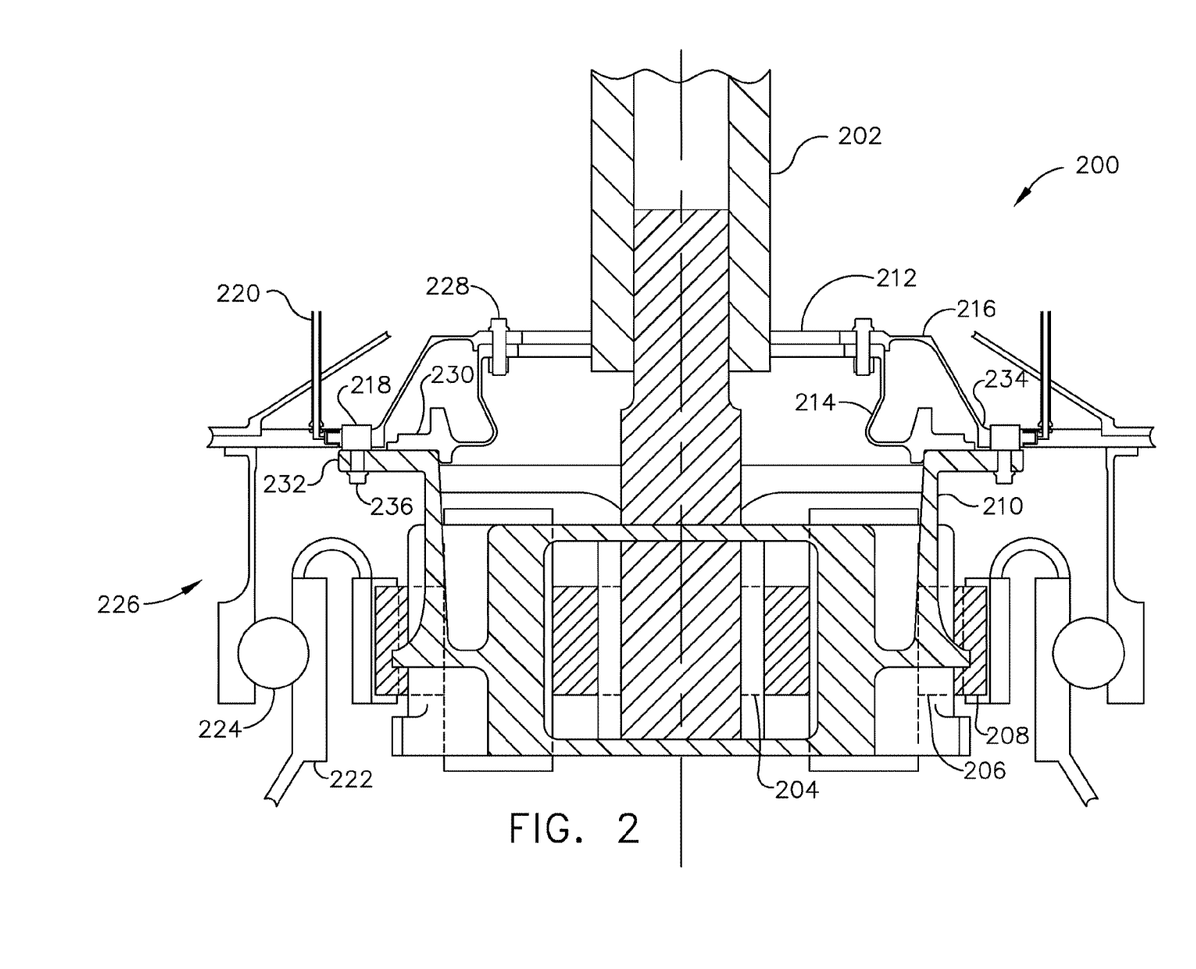
FIG. 2 is a schematic illustration of a soft mounted epicyclic gear train, in which an aspect of the methods and systems described herein may be employed in accordance with one embodiment of the present disclosure.

FIG. 2 is a schematic illustration of a soft mounted epicyclic gear train 200. In the exemplary embodiment, epicyclic gear train 200 is a planetary gear train. In one embodiment, epicyclic gear train 200 is housed within integrated drive power gearbox 122 (shown in FIG. 1). In other embodiments, epicyclic gear train 200 is located adjacent to integrated drive power gearbox 122 (shown in FIG. 1) and is mechanically coupled thereto.

In the exemplary embodiment, an epicyclic gear train 200 includes a power engine shaft 202, a sun gear 204, a plurality of planetary gears 206, a ring gear 208, and a planet carrier 210. Epicyclic gear train 200 further includes a soft mount 212 having an inner flexible sleeve 214, an outer flexible sleeve 216, and a plurality of damping couplers 218. In an exemplary embodiment, epicyclic gear train 200 includes a lubricant supply system 220 configured to deliver lubricant to damping couplers 218. Epicyclic gear train 200 further includes a power engine rotor 222, rotor bearings 224, and an engine casing 226. Power engine rotor operates similarly to power engine rotor 120 (FIG. 1).

Power engine shaft 202 is fixedly coupled to sun gear 204. Sun gear 204 is configured to engage planetary gears 206 through a plurality of complementary teeth (not shown) radially spaced about respective outer peripheries of sun gear 204 and planetary gears 206. Planetary gears 206 are maintained in respective positions relative to one another by stationary planet carrier 210. Planetary gears 206 are rotationally coupled to an output shaft (not separately numbered) of power engine rotor 222, which extends axially from planet carrier 210. Planetary gears 206 are configured to engage ring gear 208 through complementary teeth (also not shown) circumferentially spaced about a radial inner periphery of ring gear 208. In the example embodiment, sun gear 204 and planetary gears 206 are rotating members, while planet carrier 210 is a stationary member.

Flexible inner sleeve 214 is fixedly attached to flexible outer sleeve 216 at a common central location (not numbered) about power engine shaft 202 by a plurality of sleeve bolts 228. Flexible inner sleeve 214 and flexible outer sleeve 216 of soft mount 212 may also be formed of a unitary, integral construction. An outer base 230 of flexible inner sleeve 214 is fixedly attached to an upper flange 232 of planet carrier 210. An outer attachment portion 234 of flexible outer sleeve 216 is fixedly coupled to engine casing 226. Upper flange 232 and outer attachment portion 234 are coupled together by damping coupler 218. In an embodiment, damping coupler 218 is fixedly attached to upper flange 232 by a connector bolt 236.

In an embodiment, during operation, epicyclic gear train 200 is exposed to different stresses as the gas turbine engine 100 (see FIG. 1) is subjected to changes in operational speeds and/or inertial loads resulting from takeoff or significant maneuvers, for example. Under such stresses, soft mount 212 allows planet carrier 210 to deflect under known load conditions more than would be possible if the carrier was rigidly mounted to engine casing 226. Flexible inner sleeve 214 and flexible outer sleeve 216 act like a spring between planet carrier 210 and engine casing 226, and thus serve to more evenly distribute loads across individual gears. Too much movement of planet carrier 210 with respect to engine casing 226, however, could result in liberation of or damage to rotating parts of epicyclic gear train 200, which is undesirable.

Additionally during operation, power engine shaft 202 rotates at different higher and lower input shaft speeds as the aircraft accelerates and decelerates. Rotation of gears 204, 206, 208 creates vibration within epicyclic gear train 200, which can be translated to engine casing 226. Rotation and vibration of gears 204, 206, 208 also can cause planet carrier 210 to rock in the axial, radial, and circumferential directions. The magnitude of such movement may be harmonic when the respective gears are operating at a steady, desired rotational speed. As engine speed changes, for example, from ground idle speed to a flight idle, vibration emanating from epicyclic gear train 200 will increase when crossing natural resonances of engine structure. This increased vibration will increase the magnitude of movement, or deflection, planet carrier 210 experiences axial, radial, and circumferential directions.

Damping coupler 218 limits the magnitude of deflection planet carrier 210 is capable of experiencing with respect to engine casing 226 by effectively coupling flexible inner sleeve 214 with flexible outer sleeve 216 of soft mount 212. Different flexures between flexible inner sleeve 214 and flexible outer sleeve 216 will permit some axial, radial, and circumferential movement of planet carrier 210. The magnitude of this movement, or deflection, is limited in all three directions by damping coupler 218. Damping coupler 218 further includes damping capability to attenuate vibrations from epicyclic gear train 200 engine casing 226, as well as vibrations internally generated by epicyclic gear train 200. In an aspect of the embodiment, oil from lubricant supply system 220 is delivered to damping coupler 218 to act as a vibration damping agent. In an embodiment, a supply fluid is configured to resist movement within damping coupler 218 such that vibratory motion from one portion of damping coupler 218 is attenuated, or damped, another portion of damping coupler 218, as explained further below respect to other embodiments. As epicyclic gear train 200 vibrates, damping fluid (such as oil) is forced out of damping coupler 218. A steady fluid supply though, allows the damping agent to be replaced as needed.

It is noted that the particular location of damping coupler 218 shown in FIG. 2 is an exemplary embodiment, and not meant to be limiting. Damping coupler 218 can also be located elsewhere along upper flange 232 of planet carrier 210, engine casing 226, or on portions of inner flexible sleeve 214 and outer flexible sleeve 216, such that deflection and vibration between inner flexible sleeve 214 and outer flexible sleeve 216 are damped.

Figure 3:
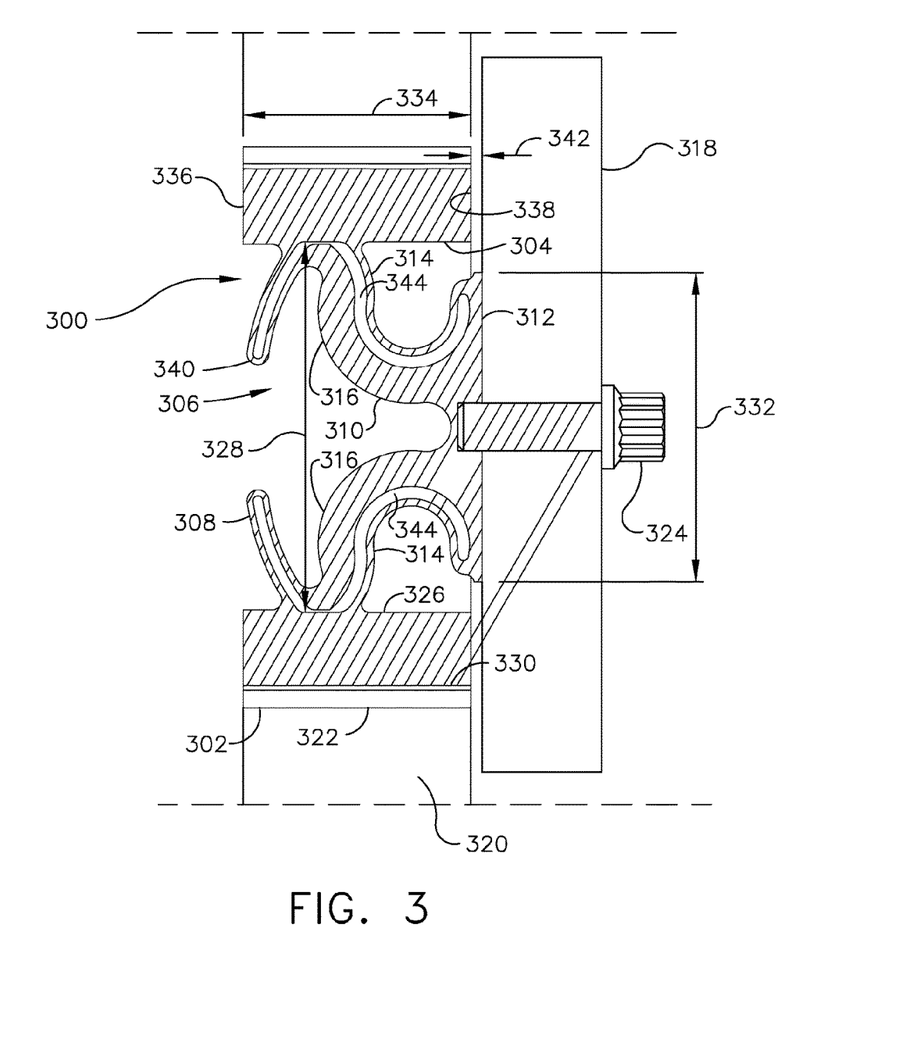
FIG. 3 is a sectional view of a damping, according to an exemplary embodiment.

FIG. 3 is a sectional view of a damping coupler 300. In the exemplary embodiment, damping coupler 300 is disposed similarly to damping coupler 218 shown in FIG. 2. Damping coupler 300 includes a coupling ring 302, and spline ring 304, and a central axial spring 306. In an aspect of the embodiment, central axial spring includes a dome upper portion 308 and a stem lower portion 310. Stem lower portion 310 includes a flat base 312. In a further aspect of the embodiment, central axial spring 306 includes an inner body 314 and an outer body 316.

In an aspect of an embodiment, damping coupler 300 is illustrated in an exemplary configuration with respect to a planet carrier flange 318 and an engine casing extension 320. According to this exemplary configuration, an outer cylindrical periphery 322 of coupling ring 302 is constrained by fitted coupling with engine casing extension 320. Alternatively, coupling ring 302 can be constrained by fitted coupling with a rigid, extending portion of a flexible outer sleeve of a soft mount mechanism (not shown), similar to flexible outer sleeve 216 shown in FIG. 2.

Flat base 312 of stem lower portion 310 fixedly attaches planet carrier flange 318. In an exemplary embodiment, flat base 312 is securely fixed to planet carrier flange 318 by a coupler bolt 324. In an aspect of the embodiment, stem lower portion 310 is concavely shaped with respect to an inner cylindrical surface 326 of spline ring 304. Dome upper portion 308 is convexly shaped with respect to inner cylindrical surface 326, and forms a generally toroidal shape. A first outer diameter 328 of dome upper portion 308 of outer body 316 extends to inner cylindrical surface 326. In an embodiment, outer body 316 is integrally formed with inner cylindrical surface 326 of spline ring 304 as a unitary piece.

Coupling ring 302 and spline ring 304 are separated by a slot 330. In an embodiment, slot 330 is filled with a damping agent (not shown) configured to resist movement of the spline ring 304 with respect to the coupling ring 302 and damp vibratory motion therebetween. In an exemplary embodiment, the damping agent is oil delivered from a lubricant supply system, such as lubricant supply system 220 in FIG. 2. In an alternative embodiment, the damping agent is a wire mesh vibration damper, such as a steel mesh spring. Dimensions of slot 330 can be sized according to the selected vibration damper disposed therein.

In an aspect of the embodiment, a second outer diameter 332 is smaller than first outer diameter 328. In an exemplary embodiment, coupling ring 302 and spline ring 304 share a common height 334 that defines a top dimension 336 and a bottom dimension 338 of damping coupler 300. An uppermost dimension of dome upper portion 308 may be contained within inner cylindrical surface 326 and not extend from inner cylindrical surface 326 past top dimension 336. Flat base 312 of stem lower portion 310 may extend out from inner cylindrical surface 326 in the axial direction, and past lower dimension 338. A distance 342, by which flat base 312 extends past bottom dimension 338 of damping coupler 300, defines an amount of deflection that damping coupler 300 will allow in the axial direction.

In operation, damping coupler 300 is made of a sufficiently stiff or rigid material, such as spring steel, which permits the interaction of the convex shape of dome upper portion 308 with the concave shape of stem lower portion 310 to act like a spring between axial movement of planet carrier flange 318 toward inner cylindrical surface 326 of spline ring 304 across distance 342. Additionally, flexibility of the material of stem lower portion 310 in the radial direction provides damping of radial vibration between planet carrier flange 318 and inner cylindrical surface 326 of spline ring 304. The damping agent contained within slot 330 provides further damping of radial vibration between spline ring 304 and coupling ring 302.

In another aspect of the embodiment, inner body 314 and outer body 316 of central axial spring 306 are separated by reservoir 344. In an exemplary embodiment, reservoir 344 is also filled with the damping agent, such as oil or wire mesh, and reservoir 344 is hermetically sealed near uppermost dimension 340 of dome upper portion 308 and flat base 312 of stem lower portion 310. In an aspect of the embodiment, reservoir 344 narrowest at first outer diameter 328 to permit further damping of fluid communication between dome upper portion 308 and stem lower portion 310 of central axial spring 306. Spring capabilities of central axial spring 306 are facilitated the outwardly curved shape of dome upper portion 308, while axial deflections of damping coupler 300 and central axial spring 306 are further damped by the inclusion of a damping agent (such as oil) in reservoir 344. The inclusion of the damping agent reservoir 344 thus also serves to provide additional damping and deflection limitation in the radial and tangential directions as well. Central axial spring 306 can be fabricated by additive manufacturing or integral casing processes.

Figure 4:
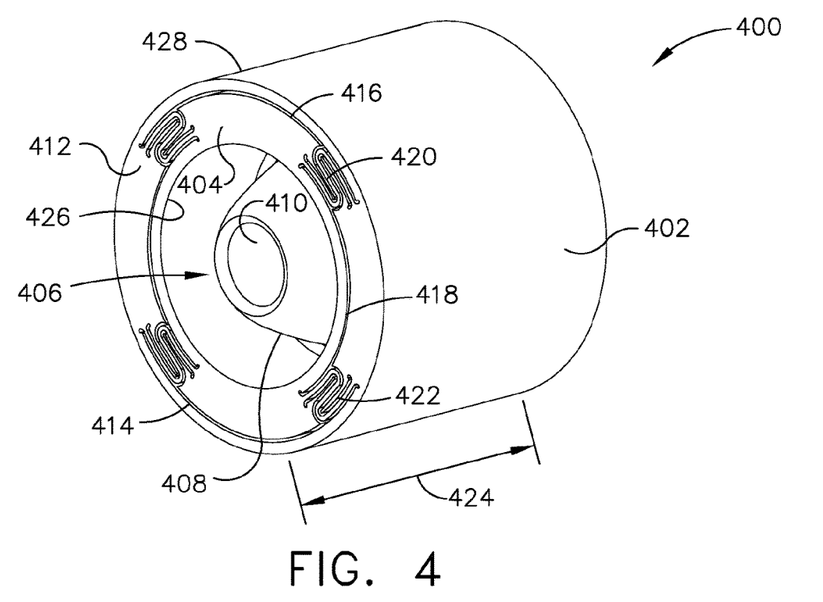
FIG. 4 is an oblique perspective view of a damping coupler, according to an exemplary embodiment.

FIG. 4 is an oblique perspective view of a damping coupler 400, according to an exemplary embodiment. In the illustrated embodiment, damping coupler 400 is similar to damping coupler 300 shown in FIG. 3. Damping coupler 400 includes a coupling ring 402 and a spline ring 404. Damping coupler 400 further includes a central axial spring 406 including a dome upper surface 408. In an aspect of the embodiment, dome upper surface 408 further includes a central opening 410. Coupling ring 402 and spline ring 404 include, in common, a top dimension 412. In an exemplary embodiment, top dimension 412 is a flat surface.

Damping coupler 400 further includes a slot 414, into which is contained damping agent (not numbered), such as a fluid or wire mesh. In an exemplary embodiment, slot 414 includes a plurality of alternating first arc-shaped portions 416 and second arc-shaped portions 418. In an exemplary embodiment, first arc-shaped portions 416 do not join adjacent second arc-shaped portions 418, but instead terminate around the contours (not separately numbered) of alternating S-shaped splines 420 and Z-shaped splines 422 in the damping coupler 400.

According to an exemplary embodiment, coupling ring 402 and spline ring 404 are formed of a unitary construction, and are joined together by alternating S-shaped splines 420 and Z-shaped splines 422. In an aspect of the embodiment, slot 414 S-shaped splines 420, and Z-shaped splines 422 extend down a height 424 of damping coupler 400 (best seen with respect to the embodiment shown in FIG. 3). Additionally, first arc-shaped portions 416 and second arc-shaped portions 418 are optionally concentric with coupling ring 402 and spline ring 404, with second arc-shaped portions 418 conforming to a circumference (not numbered) greater than that of internal circumference 426 of spline ring 404. Similarly, first arc-shaped portions 416 conform to a circumference (also not numbered) greater than that of second arc-shaped portions 418, but less than an outer circumference 428 of coupling ring 402.

In operation, flexibility of the rigid material constituting S-shaped splines 420 and Z-shaped splines 422 permits the respective splines to serve as springs against radial movement between coupling ring 402 and spline ring 404. Additionally, the damping agent contained within slot 414 further attenuates vibrations transmitted across respective S-shaped splines 420 and Z-shaped splines 422. In an exemplary embodiment, bends in the contours of S-shaped splines 420 and Z-shaped splines 422 (best seen looking perpendicular to the top dimension 412 in the axial direction) are rounded to avoid stress concentration that can occur at sharp corners. Furthermore, by contouring respective terminal ends, or shoulders, (not separately numbered) of alternating first arc-shaped portions 416 and second arc-shaped portions 418 around S-shaped splines 420 and Z-shaped splines 422, circumferential/torsional vibrations are also advantageously damped between coupling ring 402 and spline ring 404.

As illustrated in the exemplary embodiment, the plurality of first arc-shaped portions 416 and second arc-shaped portions 418 are thus shaped to match a cross section of a respective first arc-shaped portion 416 and second arc-shaped portion 418 of slot 414 (again seen looking perpendicular to the top dimension 412 in the axial direction). The respective first arc-shaped portion 416 and second arc-shaped portion 418 includes at least one shoulder (not separately numbered) configured to engage a surface of a respective S-shaped spline 420 and Z-shaped spline 422 when a relative position between coupling ring 402 and spline ring 404 changes by a predetermined amount, such that a deflection of at least one of coupling ring 402 and spline ring 404 with respect to one another is limited in the radial and circumferential directions.

Figure 5:
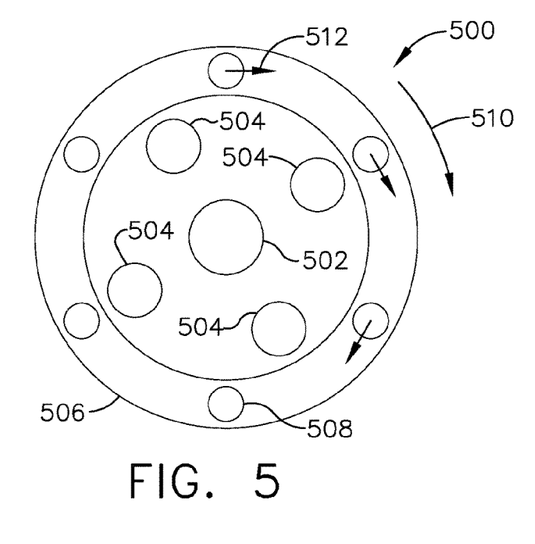
FIG. 5 is an elevated view of an exemplary planet carrier, according to an exemplary embodiment.

FIG. 5 is an elevated view of an exemplary planet carrier 500. Planet carrier 500 includes a sun gear opening 502 and a plurality of planetary gear openings 504. Planet carrier 500 further includes an upper flange 506, which includes a plurality of coupler openings 508.

Coupler openings 508 serve, for example, for fixedly attaching a plurality of damping couplers, such as damping coupler 300 shown in FIG. 3. The number of planetary gear openings 504 and the number of coupler openings 508 are merely examples, and are not intended to be limiting.

In operation, according to an exemplary embodiment, the plurality of coupler openings 508 are distributed about upper flange 506 in a generally even distribution, such that a circumferential force 510 acting on planet carrier 500 (such as from a rotational force on or harmonic rocking of planet carrier 500) can be experienced as a tangential force 512 by individual damping couplers, which can thereby attenuate circumferential force 510 linearly, through the radio radial damping capability of an individual damping coupler, such as damping coupler 400 shown in FIG. 4.

Figure 6:
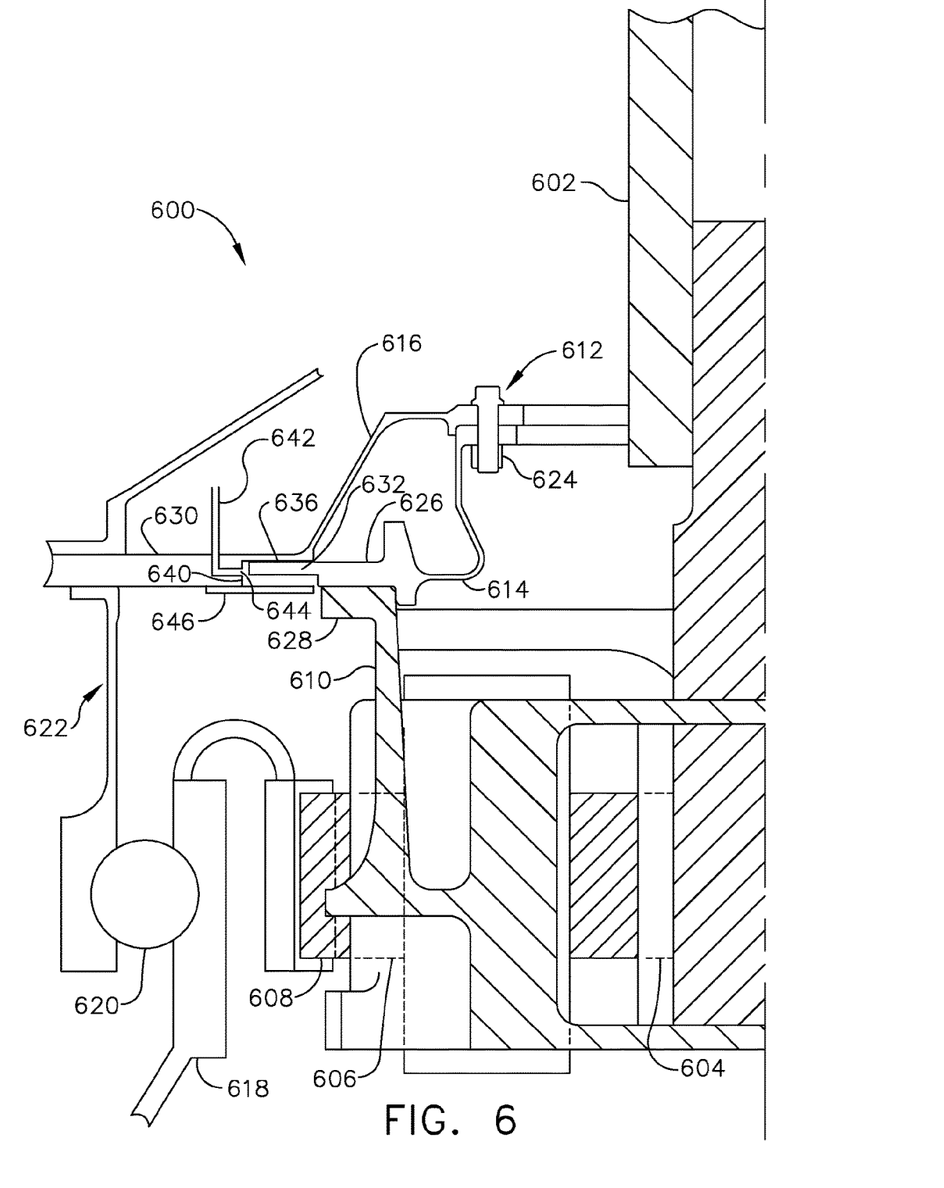
FIG. 6 is a partial schematic illustration of a soft mounted epicyclic gear train, in accordance with an alternative embodiment.

FIG. 6 is a partial schematic illustration of a soft mounted epicyclic gear train 600. In this exemplary embodiment, epicyclic gear train 600 is a planetary gear train, similar in general construction and functionality to epicyclic gear train 200 and FIG. 2. Similar to the embodiment of FIG. 2, epicyclic gear train 600 includes a power engine shaft 602, a sun gear 604, a plurality of planetary gears 606, a ring gear 608, a planet carrier 610, a soft mount 612 having an inner flexible sleeve 614, an outer flexible sleeve 616, a power engine rotor 618, rotor bearings 620, and an engine casing 622.

Flexible inner sleeve 614 is similarly fixedly attached to flexible outer sleeve 616 at a common central location (not numbered) about power engine shaft 602 by a plurality of sleeve bolts 624. An outer base 626 of flexible inner sleeve 614 is fixedly attached to an upper flange 628 of planet carrier 610. An outer attachment portion 630 of flexible outer sleeve 616 is fixedly coupled to engine casing 622.

In an exemplary embodiment, outer base 626 of flexible inner sleeve 614 further includes a plurality of internal spline teeth 632 that are disposed evenly around an outer circumference 634 (shown in FIG. 7) of outer base 626. Internal spline teeth 632 are configured to mate and alternately couple with a plurality of external spline teeth 636 that are disposed evenly around inner circumference 638 (also shown in FIG. 7) of outer flexible sleeve 616. Internal spline teeth 632 and external spline teeth 636 are separated throughout by a gap 640. In an exemplary embodiment, epicyclic gear train 600 includes a lubricant supply system 642 configured to deliver lubricant (e.g., oil) to gap 640 at a plurality of distribution openings 644.

In an aspect of the embodiment, an annular ring 646 is fixedly coupled to outer attachment portion 630 after internal spline teeth 632 and external spline teeth 636 are mated, to constrain axial movement of internal spline teeth 632 out of gap 640. Internal spline teeth 632 are sized so as to maintain gap 640 between internal spline teeth 632 and annular ring 646. A consistent spacing of 640 throughout the mating of internal spline teeth 632, external spline teeth 636, and annular ring 646 provides axial damping and deflection limitation between inner flexible sleeve 614 and outer flexible sleeve 616.

Figure 7:
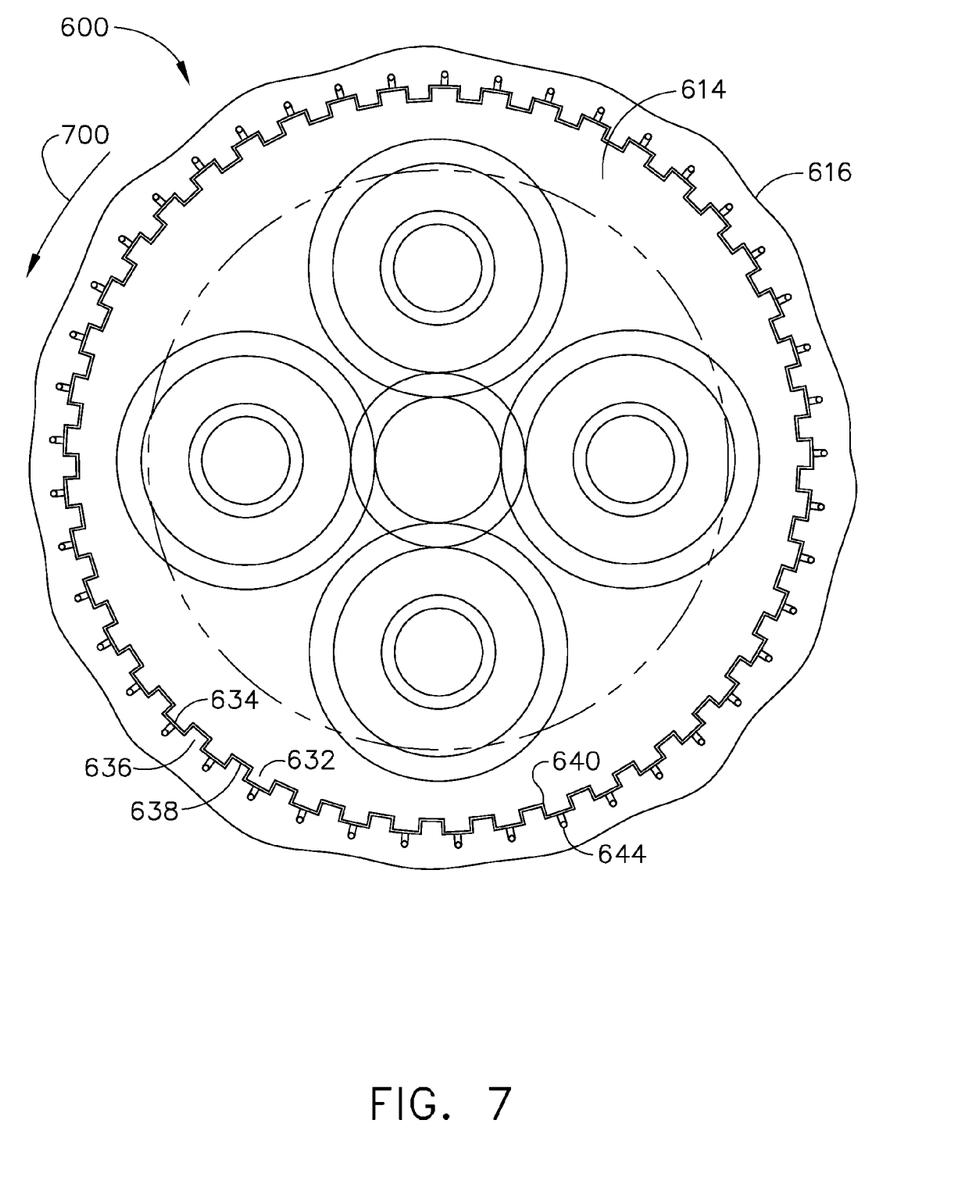
FIG. 7 is an elevated cutaway view of the inner and outer sleeve join illustrated in FIG. 6.

FIG. 7 is an elevated cutaway view of the sleeve mating of inner flexible sleeve 614 with outer flexible sleeve 616, as illustrated in FIG. 6. In the exemplary embodiment illustrated in FIG. 7, internal spline teeth 632 and external spline teeth 636 are shown to mate in an axisymmetric interdigitated spline arrangement. As illustrated, gap 640 is maintained throughout the spline arrangement, such that damping and deflection limitation is provided radially, as well as tangentially, to limit movement and vibration of inner flexible sleeve 614 with respect to outer flexible sleeve 616 in the event of a circumferential force 700 applied to epicyclic gear train 600. In the exemplary embodiment illustrated, the axisymmetric interdigitated spline arrangement is shown as a square spline. The axisymmetric interdigitated spline arrangement can also be involute, sinusoidal, or sawtooth, without departing from the scope of the embodiments described herein.

The foregoing detailed description illustrates embodiments of the disclosure by way of example and not by way of limitation. It is contemplated that the disclosure has general application to the damping of vibrations in an aircraft engine and limitation of the movement of engine parts with respect to one another, particularly parts that are subject to movement and/or vibration in multiple directions simultaneously (i.e., axial, radial, torsional). It is further contemplated that the methods and systems described herein may be incorporated into existing aircraft engine designs and structures.

It will be appreciated that the above embodiments that have been described in particular detail are merely example or possible embodiments, and that there are many other combinations, additions, or alternatives that may be included. The apparatus illustrated is not limited to the specific embodiments described herein, but rather, components of each may be utilized independently and separately from other components described herein. Each system component can also be used in combination with other system components.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A planet gear train for an engine casing, comprising:
   a sun gear rotatable by a shaft;
   a ring gear;
   a plurality of planet gears rotatably mounted in a planet carrier and meshing with said sun gear and said ring gear; and
   a damping system comprising:
      a soft mount disposed about said shaft and coupling said planet carrier to said engine casing, said soft mount including a flexible inner sleeve and a flexible outer sleeve, said flexible inner sleeve and said flexible outer sleeve being fixedly coupled together at respective central portions thereof near said shaft; and
      a plurality of damping couplers disposed about an outer flange of said planet carrier, said plurality of damping couplers flexibly coupling said flexible inner sleeve to said flexible outer sleeve.

2. The planet gear train of claim 1, wherein said plurality of damping couplers each further comprise a central axial spring and an outer radial spring.

3. The planet gear train of claim 2, wherein said central axial spring comprises a structure configured to provide flexible rigidity in an axial direction of rotation of said shaft.

4. The planet gear train of claim 2, wherein said outer radial spring comprises a structure configured to provide flexible rigidity in a radial direction perpendicular to the axial rotation of said shaft.

5. The planet gear train of claim 4, wherein at least one of said plurality of damping couplers comprises:
   a coupling ring coupled to the engine casing, said coupling ring including slots spaced circumferentially about an inner circumference of said coupling ring, each slot comprising a cross-section; and
   a spline ring coupled to said planet carrier, said spline ring including a plurality of radially extending splines shaped to match the cross section of a respective slot, the cross section of each slot including at least one shoulder configured to engage a surface of a respective spline when a relative position between said coupling ring and said spline ring changes by a predetermined amount such that a deflection of at least one of said coupling ring and said spline ring is limited in the radial and circumferential directions.

6. The planet gear train of claim 2, wherein said spline ring further comprises a cylindrical interior, and wherein said central axial spring is disposed within the cylindrical interior.

7. The planet gear train of claim 6, wherein said central axial spring is fixedly coupled to said outer flange of said planet carrier.

8. The planet gear train of claim 6, wherein said coupling ring is fixedly coupled to one of the engine casing and said flexible outer sleeve.

9. The planet gear train of claim 5, further comprising a supply of damping agent to each slot, said supply of damping agent configured to resist a movement of said spline in each slot such that a vibratory motion between said coupling ring and said spline ring is damped.

10. The planet gear train of claim 9, wherein said damping agent is a fluid.

11. The planet gear train of claim 9, wherein said damping agent is a spring steel wire mesh.

12. The planet gear train of claim 5, wherein said plurality of radially extending splines comprises a plurality of first S-shaped splines alternating with a plurality of second Z-shaped splines.

13. A method of damping torsional vibration of an epicyclic gear train having a planet carrier, said method comprising:

arranging a plurality of damping couplers evenly spaced about a generally circular periphery of the planet carrier;

applying a torsional force to the planet carrier about a central axis of the generally circular periphery; and linearly damping an amount of the torsional force experienced by each of the plurality of damping couplers in a direction tangential to the torsional force.

14. The method of claim 13, the plurality of damping couplers each comprising a radial spring having flexible rigidity in a direction tangential to a direction of rotation of the planet carrier about the central axis.

15. The method of claim 14, wherein the amount of the torsional force experienced at each of the plurality of damping couplers is linearly damped by the respective radial spring in the direction tangential to the torsional force experienced at each respective damping coupler.

* * * * *